A. E. BRION & F. C. SANFORD.
COMBINED GAS AND WATER COCK.
APPLICATION FILED MAR. 17, 1909. RENEWED SEPT. 21, 1910.
992,332.
Patented May 16, 1911.
2 SHEETS—SHEET 1.
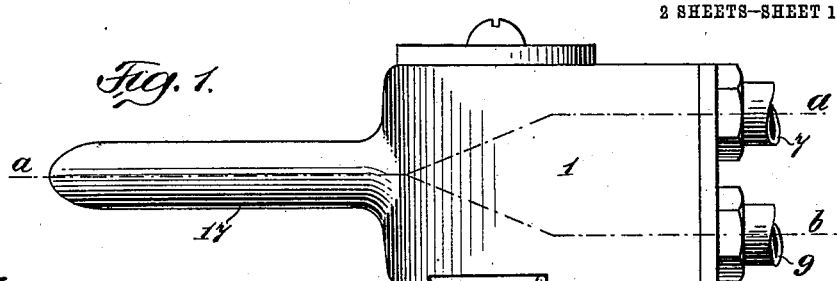
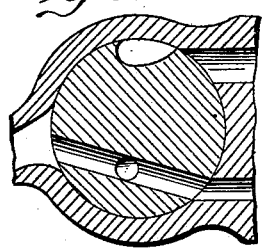
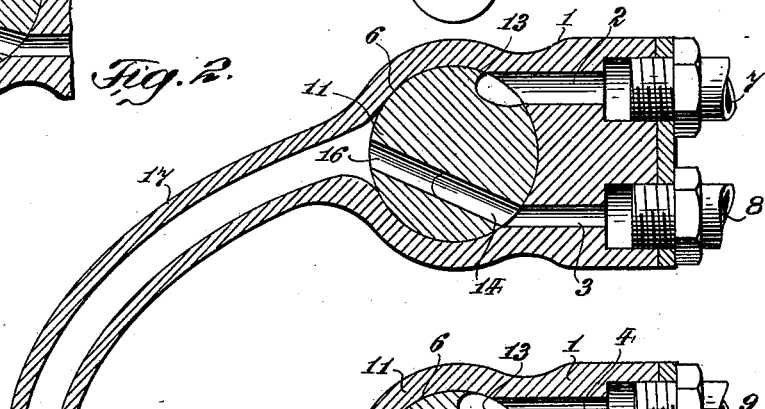
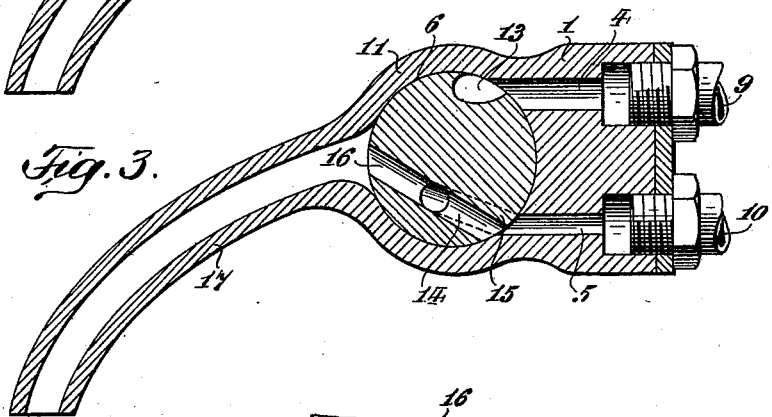
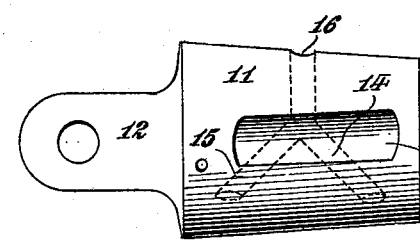
WITNESSES
Adolph E. Brion,
Frank C. Sanford,
INVENTORS
BY A. M. Pierce,
ATTORNEY.

A. E. BRION & F. C. SANFORD.
COMBINED GAS AND WATER COCK.
APPLICATION FILED MAR. 17, 1909. RENEWED SEPT. 21, 1910.

992,332.

Patented May 16, 1911.

2 SHEETS—SHEET 2.

UNITED STATES PATENT OFFICE.

ADOLPH E. BRION, OF BROOKLYN, NEW YORK, AND FRANCIS C. SANFORD, OF BRIDGEPORT, CONNECTICUT.

COMBINED GAS AND WATER COCK.

992,332.          Specification of Letters Patent.          Patented May 16, 1911.

Application filed March 17, 1909, Serial No. 483,944. Renewed September 21, 1910. Serial No. 583,125.

*To all whom it may concern:*

Be it known that we, ADOLPH E. BRION, a citizen of the United States, residing at Brooklyn, in the county of Kings and State of New York, and FRANCIS C. SANFORD, a citizen of the United States, residing at Bridgeport, in the county of Fairfield and State of Connecticut, have jointly invented certain new and useful Improvements in Combined Gas and Water Cocks, of which the following is a specification, reference being had therein to the accompanying drawing.

Our invention relates especially to the construction and arrangement of cocks employed in connection with gas water heaters, and has for its object the provision of a simple and effective device wherein the flow of gas, of hot water and of cold water are all controlled and regulated by a single plug.

To attain the desired end, our invention involves certain novel and useful combinations or arrangements of parts, and peculiarities of construction and operation, all of which will be hereinafter first fully described and then pointed out in the claims.

Figure 6:
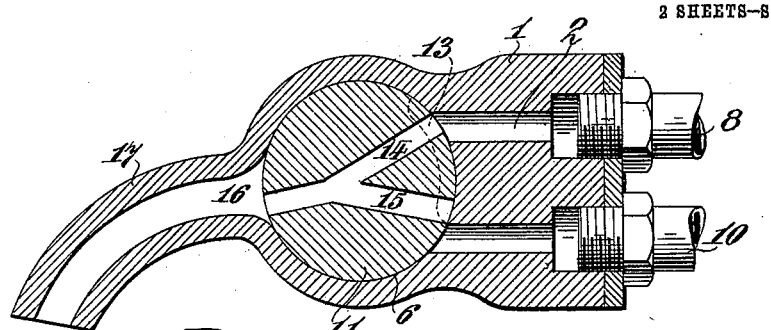
Figure 7:
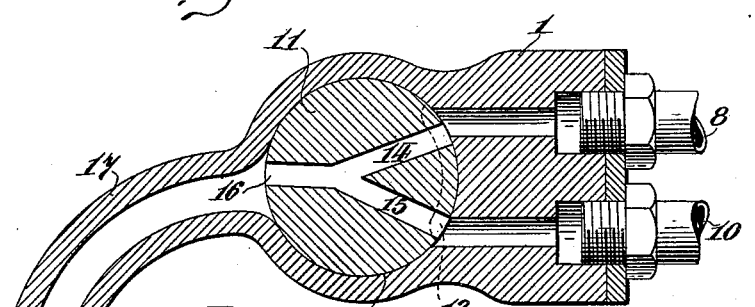
Figure 8:
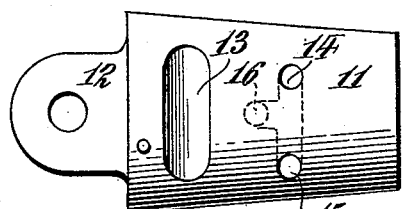

In the drawing, Figure 1 is a plan view of a cock embodying our invention. Fig. 2 is a vertical, sectional view at line *a—a* of Fig. 1. Fig. 3 is a like view at line *a—b*. Fig. 4 is a side elevation of the plug removed from the body of the cock. Fig. 5 is a sectional view showing the plug turned so as to close all but one of the passages therethrough. Figs. 6, 7 and 8 show a modified form of construction, and location of the passages through the plug.

Similar numerals of reference, wherever they occur, indicate corresponding parts in all the figures.

Referring to Figs. 1, 2, 3, 4 and 5, 1 is the body of the cock, made of any approved material and having a cavity 6 for the reception of a plug 11. 2, 3, 4 and 5 are passages leading from the exterior of the body 1 to the plug-cavity 6. 7, 8, 9 and 10 are conducting pipes communicating with the several passages 2, 3, 4 and 5. The plug 11 is provided with a stem 12 for the reception of an operating handle. The plug 11 is provided with a longitudinal conducting passage 13, and two diagonal passages 14 and 15 on different planes, which communicate with a single passage 16. 17 is an outlet pipe from the plug-cavity.

When constructed and arranged in accordance with the foregoing description, the operation of our device is as follows: Pipes 7 and 9 are connected to a gas supply and a gas burner arranged for heating water in any well known manner. Pipe 8 is connected with a cold water supply, and pipe 10 communicates with the heating coil. The plug is so turned when the cock is not in operation as to shut off the flow of water and gas. By turning said plug so the passage 13 is in full communication with passages 2 and 4, the gas enters from pipe 9 and flows through pipe 7 to the burner. By turning the plug 11 to the position shown in Figs. 2 and 3, while the flow of gas is not cut off, the passages 14 and 15 are partially opened so as to permit a flow of both hot and cold water through the passage 16 and outlet pipe 17. If the water is too hot, by turning the plug slightly more cold water is allowed to pass while the hot water is partially cut off, and at the same time the flow of gas to the heating burner is reduced. If the water is too cold, a reversal of movement of the plug restricts the flow of cold water and augments the supply of gas to the heater and flow of hot water to the cock, and all such changes are obtained by the manipulation of a single plug.

In the modified construction illustrated in Figs. 6, 7 and 8 of the drawing, the plug 11 is provided with a peripheral gas passage 13, at right angles to the position shown in Fig. 4, and the water passages 14 and 15 have their inlets in line with the rotation of the plug, each communicating with the discharge passage 16. When the parts are in the position illustrated in Fig. 6, cold water alone passes through the cock, the gas being shut off. If the plug 11 be turned to the left, both the hot and cold water passages will be closed, as well as the gas cut off. Reversing the movement of the plug 11, bringing the parts to the position shown in Fig. 7, gas is turned on, as well as hot and cold water.

Having now fully described our invention, what we claim as new therein and desire to secure by Letters Patent, is:

1. In a combined gas and water cock the combination with a body provided with four passages in one of its sides communicating with conducting pipes, and with an outlet passage, of a plug having a single passage way communicating with two of the conducting pipes, and separate passage ways each communicating with a single inlet and extending into the body of the plug at different angles and having a common conduit to the outlet passage from the body, substantially as shown and described.

2. In a device of the character herein specified, the combination with a body, provided with four fluid conduits arranged in pairs communicating with a plug cavity, of a plug having a peripheral cavity arranged to connect two of the fluid conduits, a Y-shaped conduit in the body of the plug having its branch limbs each communicating with one of the other fluid conduits, and an escape conduit communicating with the branch limbs of the Y-shaped conduit, through the body of the plug, the whole arranged to operate substantially as shown and described.

3. The combined gas and water cock comprising a hollow body having four passages in one side arranged in pairs in horizontal alinement, gas pipes connected to one pair of said passages, water pipes connected to the other pair of passages, an outlet pipe extending outwardly from the opposite side of said body, a plug mounted in said body provided with a longitudinal passage in its side, and a Y-shaped passage formed in said plug for communicating said inlet water passages with said outlet pipes.

4. A combined gas and water cock comprising a hollow body having four passages formed in one side arranged in pairs in horizontal alinement, gas pipes connected to two of said passages, water pipes connected to the other two passages, an outlet pipe extending outwardly from said body, opposite said passages, a plug mounted in said body provided with a longitudinal passage in its side for communicating said passages, said plug being provided with diagonal passages in different horizontal planes communicating at one end with a straight passage extending into said plug, and adapted to register with the outlet pipe.

In testimony whereof we hereto affix our signatures in presence of two witnesses.

ADOLPH E. BRION.
FRANK C. SANFORD.

Witnesses:
A. M. PIERCE,
CLARA A. BECKER.

---

Copies of this patent may be obtained for five cents each, by addressing the "Commissioner of Patents, Washington, D. C."